P. E. WIRT.
TIRE CONSTRUCTION.
APPLICATION FILED JAN. 13, 1909.

951,873.

Patented Mar. 15, 1910.

4 SHEETS—SHEET 1.

WITNESSES:

INVENTOR
Paul E. Wirt
BY
his Attorney

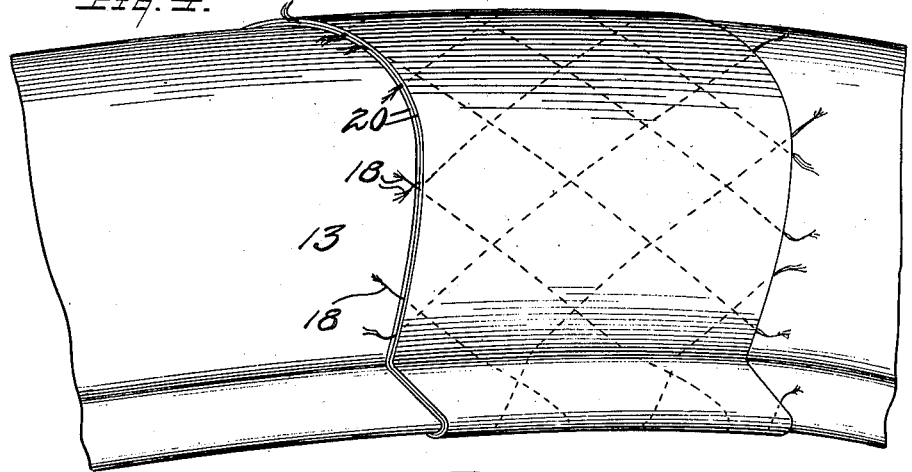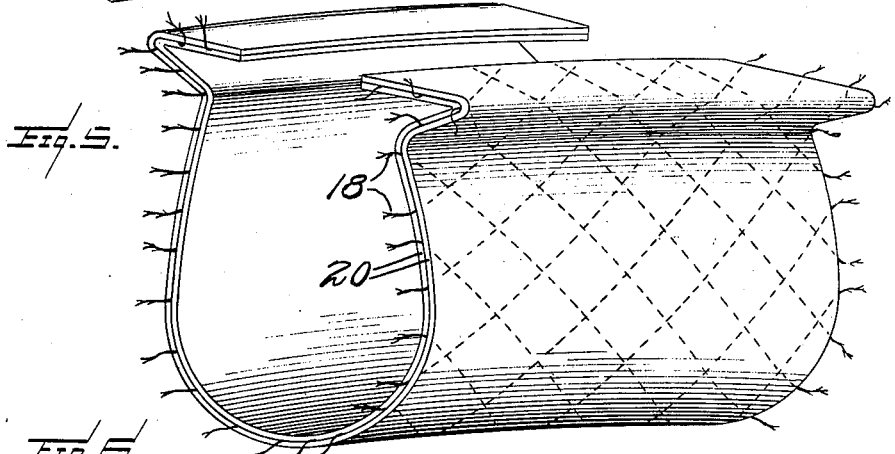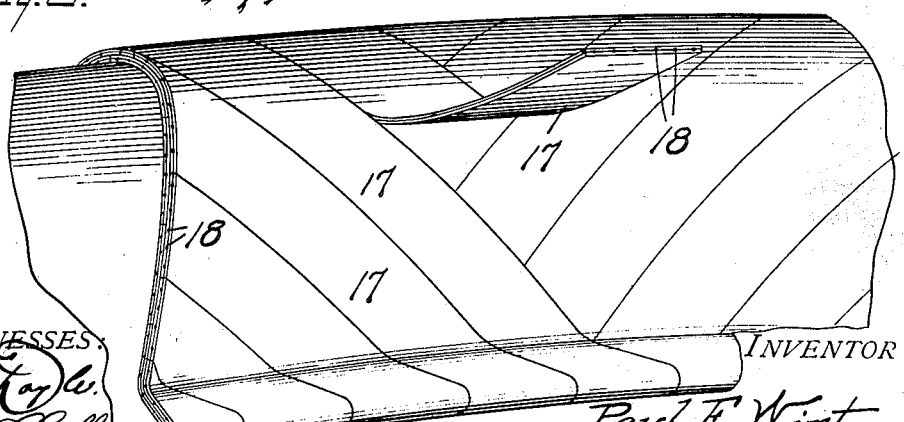

P. E. WIRT.
TIRE CONSTRUCTION.
APPLICATION FILED JAN. 13, 1909.

951,873.

Patented Mar. 15, 1910.
4 SHEETS—SHEET 3.

WITNESSES:

INVENTOR
Paul E. Wirt
BY
his Attorney

P. E. WIRT.
TIRE CONSTRUCTION.
APPLICATION FILED JAN. 13, 1909.

951,873.

Patented Mar. 15, 1910.
4 SHEETS—SHEET 4.

WITNESSES:

INVENTOR
Paul E. Wirt
BY
his Attorney

UNITED STATES PATENT OFFICE.

PAUL ESTERLY WIRT, OF BLOOMSBURG, PENNSYLVANIA.

TIRE CONSTRUCTION.

951,873.  Specification of Letters Patent.  Patented Mar. 15, 1910.

Application filed January 13, 1909. Serial No. 472,128.

*To all whom it may concern:*

Be it known that I, PAUL E. WIRT, a citizen of the United States, residing at Bloomsburg, in the county of Columbia and State of Pennsylvania, have invented certain new and useful Improvements in Tire Construction, (Case F,) of which the following is a specification.

The primary object of the present invention is to provide a novel tire structure, in which reinforcing means are employed that will not materially impair the resiliency of the tire, but will greatly strengthen the same and will effectively prevent blow-outs or ruptures from the internal pressure.

A further object of the invention is to provide reinforcing means of great tensile strength and yet peculiarly flexible and not liable to severance, said means being, however, of such character that should a break occur, the broken portions will not be liable to wear, injure or puncture the tire fabric.

Still another object is to provide a laminated or built up structure with the reinforcements so arranged that they can be placed in the sections, units, or segments, before the latter are brought in properly associated relation to produce the tire.

Figure 1:
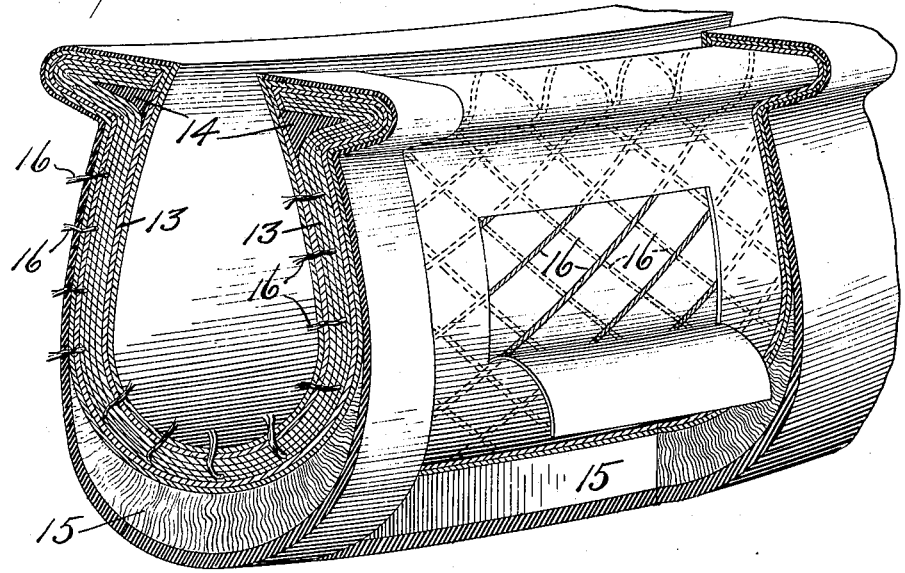
Figure 2:
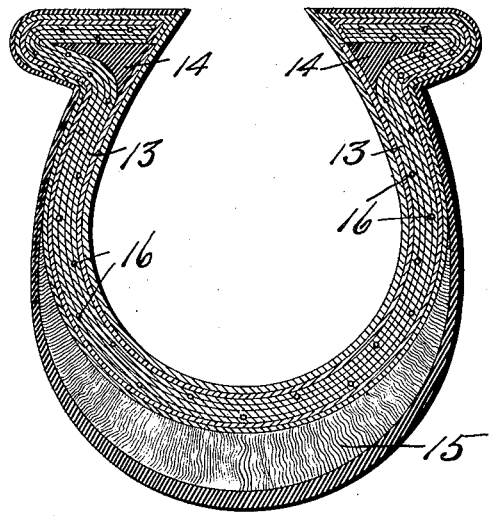
Figure 3:
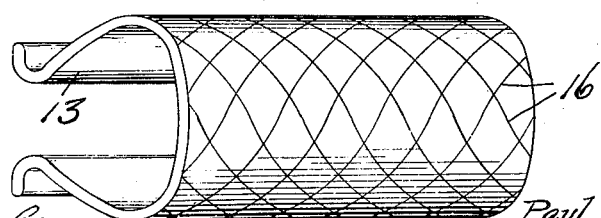
Figure 7:
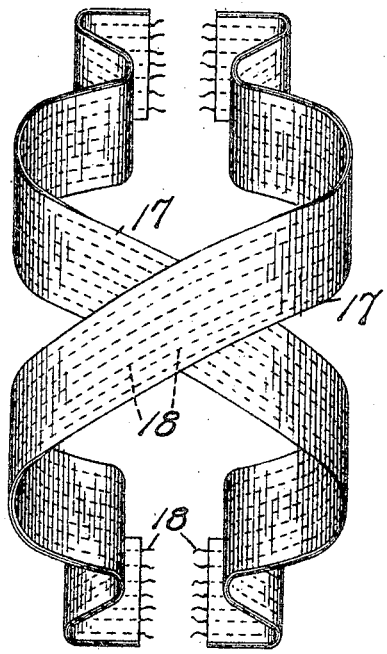
Figure 8:
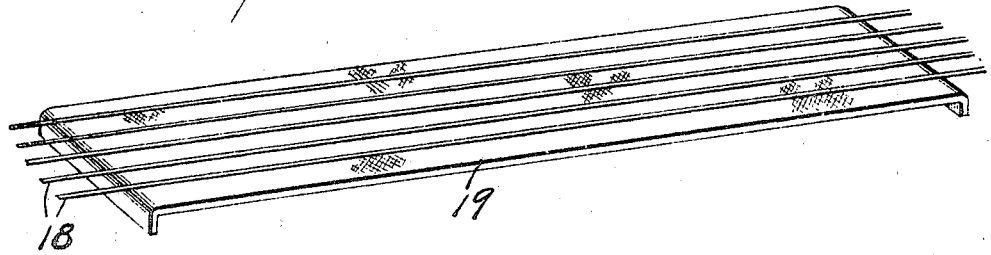
Figure 9:
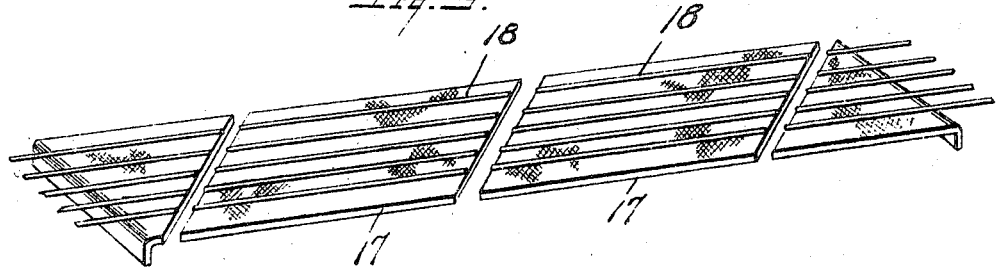
Figure 10:
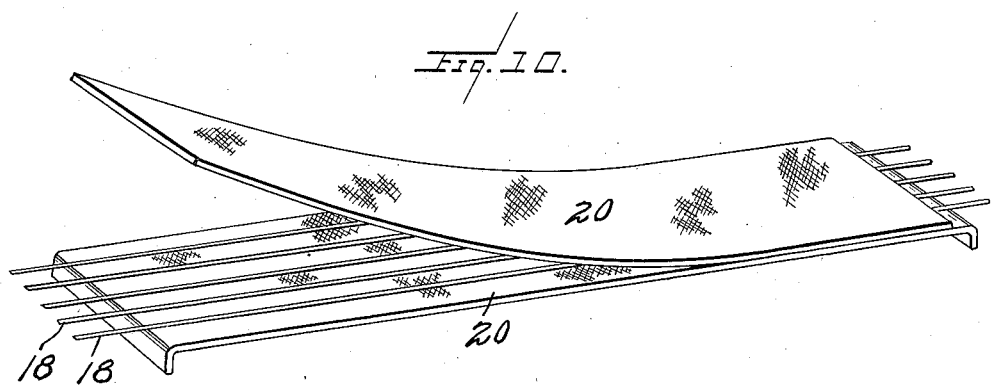
Figure 11:
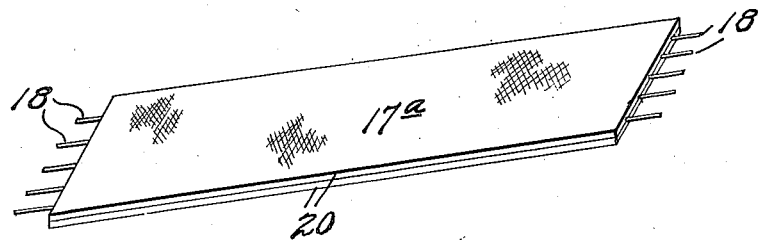
Figure 12:
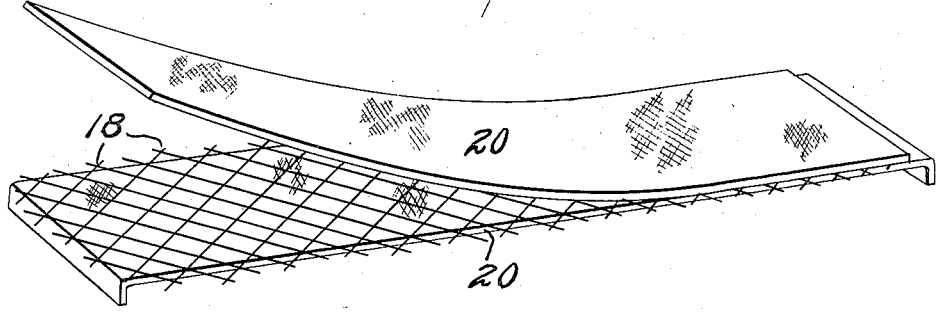

The above various objects and others which will be apparent to those skilled in the art when the invention is fully understood, are secured to the several embodiments disclosed in the accompanying drawings, wherein:

Figure 1 is a sectional perspective view of a portion of a tire, showing parts broken away in order to illustrate the internal structure. Fig. 2 is a cross sectional view therethrough. Fig. 3 is a plan view in outline and partially diagrammatic in its character. Fig. 4 is a detail perspective view illustrating the manner of producing the tire body. Fig. 5 is a detail perspective view of the tire section shown in Fig. 4, but reversed. Fig. 6 is a detail perspective view of a modified form of construction. Fig. 7 is a plan view of two of the elements or units illustrating the manner in which the same are associated. Fig. 8 is a view of one form of blank that may be employed. Fig. 9 illustrates the manner in which said blanks are cut. Fig. 10 is a perspective view of another form of blank. Fig. 11 is a perspective view of an element or unit cut therefrom. Fig. 12 is a detail perspective view of still another embodiment of the blank structure.

Similar reference numerals designate corresponding parts in all the figures of the drawings.

In the embodiment disclosed in Figs. 1, 2, and 3, the tire body may be as usual formed of superposed sheets or layers 13, the ends of which are wrapped about clencher cores 14. In this form of construction, there is preferably provided a tread portion 15, but in so far as the particular type of tread portion is concerned, no claim is herein made thereto, as it constitutes the subject-matter of another application, filed simultaneously herewith, Serial No. 472,126. In fact the patentable features of this case may or may not be employed in connection with tread portions. Embedded in the tire body, preferably by being placed between the layers 13, are reinforcing elements 16. It will be noted that these elements do not extend directly about the tire, but are disposed diagonally therein. They may be constructed in a variety of ways, but preferably each element consists of a plurality of strands of fine soft wire braided together, very much on the order of wire employed for hanging pictures. They will thus yield radially, are not apt to become broken, and have great tensile strength. At the same time, should they break from any cause, each individual strand is so pliable and soft that it will readily yield, and will not puncture or enter the surrounding fabric or material. The ends of these reinforcing elements are bent about the clencher cores 14, and thus reinforce the clencher flanges while constituting effective anchors against detachment. By employing diagonally disposed reinforcing elements of the character disclosed, it will be evident that great tensile strength is insured in the body or casing, and yet said elements produce practically no resistance to the resiliency of the tire. The arrangement is decidedly advantageous over concentrically or right angularly disposed reinforcing devices, which tend to create a stiffening arch that is much harder and less springy and yielding than the comparatively long diagonally disposed strands now employed. As many layers of these reinforcing devices may be employed as desired, and they may be arranged in different ways. Thus, as illustrated in Figs. 1, 2, and 3, the different sets of strands extend in opposite directions, and the crossing of said strands increases the strength of the tire.

Taking up now Figs. 6–12 inclusive, in this embodiment of the invention, the tire body or case is composed of forming-units 17 arranged in layers, as illustrated, said units being diagonally disposed, and those of the different layers extending in opposite or crossed directions. In these units are embedded the reinforcing elements 18 which are preferably disposed longitudinally therein, as shown. Said units may be of the same material as above described. In producing this type of tire, the reinforcements are preferably placed in the units prior to the association of said units into the tire structure. Different ways of producing the same are illustrated in Figs. 8–12 inclusive. Thus in Fig. 8, a blank 19 is employed and the reinforcing wires 18 are embedded in one surface. The said blank is then cut diagonally, as illustrated in Fig. 9, producing the units 17 already described. In Figs. 10 and 11, the blank is formed of sections or strips 20, between which the reinforcements 18 are placed, the sections or layers being then pressed together with the wires embedded in the same, after which they are cut into units 17ª as shown in Fig. 11. In Fig. 12, the reinforcements are illustrated as diagonally disposed and are crossed, though said crossed disposition may or may not be employed as desired. When the reinforcements are placed between sheets as above described, they are pressed or rolled well together, so as to produce as little thickness as possible, and provide an even flexible sheet. It is preferable in all the forms to use a rubberized fabric, which need not necessarily be thick nor very strong. In fact, a light fabric netting, commonly known as mosquito netting, may be employed, over which is placed a very thin sheet of soft rubber, the reinforcing elements being stretched at the necessary intervals apart over the same. Another very thin sheet of rubber with a backing of the same netting is then placed upon the above described structure, and the whole compactly pressed, thereby providing a very desirable clothing for the reinforcing strands. The principal reason for using the thin flexible fabric in connection with the rubber is that when the reinforcing sheet inclosing the wires is built into the tire, it is more stable in handling more flexible and more easily bent, flattened or formed into shape without inclosing or trapping air to interfere with proper vulcanization.

It is desired to lay strong emphasis on the use of woven, twisted, or braided metal reinforcing strands made of quite thin wire. This form of construction secures the greatest flexibility along with the greatest tensile strength, and also in the event of breakage the constituent wires of the strand are so weak that they could not penetrate inwardly through the thicknesses of fabric back of them into the inner tube to puncture the same. They are so enfolded or incased and vulcanized in the tire that sharp or acute bending of the strands cannot take place as the tire is used and, therefore, breaking is a remote contingency. Thicker wire strands would break more easily on slight but continuous bending and stiff broken ends would more readily intrude or protrude. To insure further durability and prevent oxidation or corrosion, the strands may be woven from thin non-corrosive wire, as from brass or copper wire. In constructing the reinforcing sheets, after the metal strands are placed at intervals between sheets of rubber or rubberized material the whole is rolled or pressed to a flat surface. The woven or braided metal strands flatten down in the rolling and the whole body is of even surface to apply to the tire body, and so lies down closely and snugly to place, thereby eliminating air to insure positive vulcanization. When the reinforcing sheet is made of rubbered fabric sheets the fabric should be as heretofore stated, quite thin and flexible to permit of conformation to the fabric foundation casing.

In further exemplification of the invention herein described, it may be explained, particularly with reference to the group of Figs. 8 to 12 inclusive, that the method of preparing the metal corded reinforcement or reinforcement sheets is substantially to embody the cord either in a thin sheet of soft rubber or between sheets of rubberized fabric. In any case, the strands are stretched in lengths at any desired intervals apart, over a sheet of soft rubber or fabric, and then rolled or pressed into the same, so as to provide an even surface for the sheet when used upon the tire. Where the cord is placed between sheets they are likewise pressed or rolled well together, so as to produce as little thickness as possible, and to provide, as before stated, an even flexible stable sheet from which are prepared the sections or proper sized pieces to be placed upon or within the tire casing. It will therefore be observed that the reinforcing sheet prepared as described is substantially the same in the practical application of building up the casing of the tire, as one of the thicknesses or sheets of the ordinary rubberized canvas that is used in the ordinary tire construction. And, as before stated, a group of straight or stretched metal strands at proper intervals apart and lying or traveling upon the same plane, may be pressed or rolled upon or between rubber, rubberized fabric, or netting in sheets of very considerable length, so as to facilitate preparation and handling for use in building up the same within the tire when cut to the proper shape, and proper sized pieces.

By way of illustrating the application of the features of the invention above referred to, it will be observed that Figs. 4 and 5 of the drawings suggest one manner of using a reinforcement sheet constructed as shown in Fig. 12 of the drawings. In the same connection, it will be further noted that in applying the reinforcement sheets to a tire structure such as suggested in Figs. 4, 5, 6 and 7, it will be understood that one or more layers of rubberized fabric commonly used in ordinary tire construction are first applied to the core, and then over these and flattened or rolled perfectly to the same, is applied rubberized reinforcing sheets or pieces constructed in the manner exemplified by Figs. 8 to 12 inclusive of the drawings. It will, of course, be understood that after the reinforcement sheets are laid as desired upon the casing or tire, one or more layers of the usual rubberized fabric may be placed over the same in the usual way, and then over the outer layer of rubberized fabric, the usual outer cover of soft rubber is applied and the whole then vulcanized together.

It is well known that in the ordinary tire construction the rubbered fabric is usually so arranged that the ends and side edges of the sheets or strips of material overlap, and each successive overlying layer (and there are usually from four to seven of them) has its overlapping joint. At these overlapped joints of the respective layers the casing is thickened to that extent at all the points of overlap around and within the casing. This condition in the ordinary tire structure operates against the durability of the tire and accelerates breakage thereof. It is therefore the purpose of the present invention to provide a structure which obviates the production of these overlapped joints, and consequent thickening at all the points of overlap around and within the casing. In this connection particular attention is invited to the specific form of the invention shown in, and exemplified by, Figs. 6 and 7 of the drawings. As plainly shown in Fig. 6, the diagonally disposed strips of reinforced sheet material are laid on flatwise, with the adjacent strips, in each layer thereof, arranged in abutting edge to edge relation without overlap. This permits the casing to be built up from these strips without crimping, overlapping, or gaping, and at the same time produce, when the casing is fully covered, a flat and smooth exterior surface for the final covering of rubber.

Various changes in the form, proportion, and minor details of construction may be resorted to without departing from the spirit or sacrificing any of the advantages of the invention, and in this connection, it is to be understood that while stress has been laid herein on the diagonal arrangement or disposition of the reinforcing devices or strands, the essential features of the invention may be preserved with such reinforcing devices or strands arranged in any direction and in any relation with respect to the body of the tire, and it is intended that the claims herein shall comprehend these different embodiments of the invention.

I claim:

1. A tire comprising a body made up of a plurality of layers of flexible material, and individual unconnected reinforcing strands located between the layers and arranged diagonally in said body, said strands consisting of thin, soft pliable wires.

2. A tire comprising a body composed of layers of flexible material and clencher elements including cores about which the layers are wrapped, and individual reinforcing strands located between the layers and having their terminal portions extended into said clencher elements about the cores therein.

3. A tire comprising a body made up of a plurality of layers of flexible material, and individual unconnected reinforcing strands located between the layers and arranged diagonally in said body, said strands consisting of thin soft pliable wires braided together.

4. A tire comprising a body composed of layers of flexible material and having clencher elements, and reinforcing elements consisting of braided soft wire strands extending diagonally within the body and into said clencher elements.

5. A tire comprising a body made up of a plurality of layers of flexible material and diagonally disposed reinforcing strands between the layers, the strands between different layers extending in different directions.

6. A tire comprising a body made up of diagonally disposed strips of sheet material and reinforcing strands embedded in the sheets and disposed longitudinally thereof.

7. A tire comprising a body made up of diagonally disposed strips of sheet material secured together and reinforcing strands located between the sheets and disposed longitudinally thereof.

8. A tire comprising a body made up of diagonally disposed strips of sheet material arranged in layers, the different layers extending in opposite directions, and reinforcing strands located between the layers and disposed longitudinally thereof.

9. A tire comprising a body made up of diagonally disposed strips of sheet material and reinforcing elements comprising strands braided together, said elements being embedded in the sheets.

10. A tire comprising a body made up of diagonally disposed strips of sheet material arranged in layers, the different layers extending in opposite directions, and reinforcing wires comprising strands braided together, said wires being located between the sheets and disposed longitudinally thereof.

11. A tire comprising a body composed of layers of flexible material and having clencher elements, and flexible reinforcing elements consisting of braided soft, pliable, wire strands located between the layers at intervals within the body and extending into said clencher elements.

12. A tire comprising a body made up of layers of flush-fitting strips of flexible sheet material, and reinforcing strands embedded in the sheets at intervals apart and disposed longitudinally thereof.

13. A tire comprising a body having layers made up of strips of flexible sheet material laid flatwise, with the adjacent strips in each layer flushly abutting in edge relation without overlap, and reinforcing strands located between the sheets.

14. A tire comprising a body having layers made up of diagonally disposed strips of flexible sheet material laid flatwise with the adjacent strips in each layer flushly abutting in edge to edge relation without overlap, and reinforcing strands located between the sheets at intervals apart and extending longitudinally thereof.

In testimony whereof I hereunto affix my signature in the presence of two witnesses.

PAUL ESTERLY WIRT.

Witnesses:
KARL F. WIRT,
R. L. ORANGE.